(12) United States Patent
Whitehead et al.

(10) Patent No.: US 12,384,629 B2
(45) Date of Patent: Aug. 12, 2025

(54) CONVEYOR BELT CARCASS CONTAINING ONE OR MORE IMPREGNATED NON-WOVEN FABRIC LAYERS

(71) Applicant: Habasit AG, Reinach (CH)

(72) Inventors: Brent Whitehead, Bacup (GB); Michael Tyler, Harrogate (GB); Marshall Wright, Ljung (SE)

(73) Assignee: Habasit AG, Reinach (CH)

( * ) Notice: Subject to any disclaimer, the term of this patent is extended or adjusted under 35 U.S.C. 154(b) by 500 days.

(21) Appl. No.: 17/284,725

(22) PCT Filed: Oct. 10, 2019

(86) PCT No.: PCT/EP2019/077429
§ 371 (c)(1),
(2) Date: Apr. 12, 2021

(87) PCT Pub. No.: WO2020/074619
PCT Pub. Date: Apr. 16, 2020

(65) Prior Publication Data
US 2022/0002088 A1    Jan. 6, 2022

(30) Foreign Application Priority Data

Oct. 12, 2018  (EP) .................................. 18200013

(51) Int. Cl.
*B65G 15/34*    (2006.01)
*B29C 70/30*    (2006.01)
(Continued)

(52) U.S. Cl.
CPC .............. *B65G 15/34* (2013.01); *B29C 70/30* (2013.01); *B32B 5/022* (2013.01); *B32B 5/266* (2021.05);
(Continued)

(58) Field of Classification Search
CPC ......... B65G 15/34; B29C 70/30; B32B 5/022; B32B 5/266; B32B 2260/023;
(Continued)

(56) References Cited

U.S. PATENT DOCUMENTS

2007/0254546 A1* 11/2007 Despault .................. D04H 3/05
156/60
2008/0078657 A1    4/2008  Hawkins et al.
(Continued)

FOREIGN PATENT DOCUMENTS

GB           1354689 A       5/1974
GB           1399896 A1      7/1975
(Continued)

*Primary Examiner* — Matthew D Matzek
(74) *Attorney, Agent, or Firm* — Hodgson Russ LLP

(57) ABSTRACT

A belt carcass (1) comprising one, two, or more than two impregnated layers (21, 22, 23, 24, 25); characterised in that i) each impregnated layer (21, 22, 23, 24, 25) comprises, or consists essentially of, a non-woven fabric (3, 301, 302, 303, 304, 305, 306, 307, 308) and an impregnation material (4, 401, 402, 403, 404, 405, 406, 407, 408) comprising, or consisting essentially of, a first thermoplastic, first thermoplastic elastomer, first elastomer or first thermoset and optional additives; whereby, if there are two or more such impregnated layers (21, 22, 23, 24, 25), they are adjacent to each other, ii) if the belt carcass (1) comprises one or more such impregnated layers (21, 22, 23, 24, 25), then reinforcing filaments extending at least in part in one given direction and being in the form of one filament layer (51) are embedded in the non-woven fabric (3) of exactly one of said impregnated layers (21); or if the belt carcass (1) comprises two or more such impregnated layers (21, 22, 23, 24, 25), then reinforcing filaments extending at least in part in one given direction and being in the form of one filament layer (52,53) are sandwiched between two adjacent such impregnated layers (21/22, 24/25), and iii) the belt carcass is devoid
(Continued)

of woven fabrics. This belt carcass can be cut into longitudinal belts or into circular disks or corner belts.

11 Claims, 2 Drawing Sheets

(51) Int. Cl.
*B32B 5/02* (2006.01)
*B32B 5/26* (2006.01)
*B29K 105/08* (2006.01)
*B29L 31/00* (2006.01)

(52) U.S. Cl.
CPC . *B29K 2105/0854* (2013.01); *B29L 2031/709* (2013.01); *B32B 2260/023* (2013.01); *B32B 2433/00* (2013.01)

(58) Field of Classification Search
CPC ....... B32B 2433/00; B32B 5/028; B32B 5/26; B32B 5/024; B32B 37/20; B32B 2038/008; B32B 2250/40; B32B 2260/048; B32B 2262/0253; B32B 2262/0261; B32B 2262/0284; B32B 2262/04; B32B 2262/101; B32B 2262/12; B32B 2305/34; B32B 2307/718; B32B 2433/04; B32B 37/16; B32B 37/04; B32B 38/08; B32B 2260/046; B32B 2262/0269; B32B 2262/106; B32B 2433/02; B32B 38/0004; B29K 2105/0854; B29L 2031/709; B29D 29/06; F16G 3/10
USPC .......................................................... 442/59
See application file for complete search history.

(56) References Cited

U.S. PATENT DOCUMENTS

| | | | |
|---|---|---|---|
| 2008/0164127 A1* | 7/2008 | Hawkins | B65G 15/32 |
| | | | 198/844.1 |
| 2012/0304874 A1 | 12/2012 | Rava | |

FOREIGN PATENT DOCUMENTS

| | | |
|---|---|---|
| JP | H09303486 A | 11/1997 |
| JP | H1191918 A | 4/1999 |
| JP | 2007137993 A | 6/2007 |
| WO | 2017/102768 A1 | 6/2017 |

* cited by examiner

CONVEYOR BELT CARCASS CONTAINING ONE OR MORE IMPREGNATED NON-WOVEN FABRIC LAYERS

FIELD OF THE INVENTION

The present invention relates to a belt carcass, in particular for a conveyor belt, machine tape, power transmission belt or spindle tape, containing impregnated layers and reinforcing filaments.

BACKGROUND ART

Woven fabric based belts are widely used e.g. as conveyor belts, machine tapes, or power transmission belts. The woven fabric acts as the traction layer. Woven fabrics are also flexible. Belt flexibility is needed to allow its bending over small-radius pulleys. However, since a woven fabric always has some elasticity in longitudinal (belt travel) direction, the belt so produced may have insufficient tenacity in longitudinal direction. In order to counteract that it has also been suggested to furthermore include into the belt, as an alternative to the woven fabric or in addition thereto, high-tenacity reinforcing filaments which extend in the belt's longitudinal direction.

In many cases the woven fabric is coated by a polymeric material. The coating seals off the fabric from the environment. This prevents contamination of conveyed goods by fabric fibres, if the belt should start to fray and the coating is absent, then the belt would require edge sealing of the woven fabric as an extra manufacture step in order to prevent such fibre contamination or further degradation of the woven material. The coatings may also act as a support for subsequent cover layer(s) that the belt might have in order to adapt to its intended application and, by virtue of its said geometrically well defined surface, also imparts the cover layer(s) the same geometrically well defined surface(s).

For best adhesion of the coating(s) to the woven fabric it is possible to either include at least in part hairy natural fibres, which by their hairy mechanical attachment points help in adhering to the coated material; or, in the case of synthetic fibres essentially devoid of such hairy attachment points, to co-use an adhesion promoter. The effectiveness of a adhesion promotor is however reduced by subsequent manufacturing and fabrication processing of synthetic fabric based belts, along with demanding product applications especially extreme heat/cooling and repetitive high stress applications, resulting in poor product integrity and separation along the interfaces, resulting a variety of undesirable (delamination/separation) product performance (durability, longevity) issues.

Having both said coating and said reinforcing longitudinal fibres in the belt may pose the problem that during the belt's use and bending over pulleys, these longitudinal fibres start to longitudinally incise through the coated material, which may lead to premature belt failure. So it has been suggested to have such reinforcing fibres embedded in and encased by the woven fabric. Here the transversal (weft) fibres of the fabric prevent said longitudinal incision at least to some extent. GB 1 390 603 discloses such a conveyor belt wherein a woven fabric embeds longitudinal reinforcement filaments.

US 2008/078657 A1 discloses a conveyor belt having at least two non-woven layers which may be needled felts and which are preferably needled together. One of the two non-woven layers is contacted, preferably both non-woven layers are impregnated, with an elastomer 12. This conveyor belt is devoid of reinforcing filaments.

US 2008/0164127 A1 discloses a conveyor belt having a non-woven layer, a woven layer and an optional second non-woven layer, such that the non-woven layers are on opposite sides of the woven layer, which are needled together. An elastomer is used to engage the woven and non-woven layers. The elastomer may optionally be impregnated into the carcass to a desired and adjustable degree. In one embodiment one side of the resulting carcass is saturated with elastomer 12 and the other side is left bare. Example 1 discloses a conveyor belt with two layers of non-woven material and a core layer of a woven scrim, having a cover layer of synthetic rubber compound The non-woven layers themselves are devoid of reinforcing filaments.

JP 2007/137993 A discloses a heat-resistant conveyor belt comprising a non-woven textile layer 2 laminated onto a base fabric 3 consisting of several layers of warps 11 and wefts 12. Non-woven textile layer 2 and base fabric 3 are needled together. Optionally there may be another non-woven textile layer 5 on the other side of the base fabric 3. The base fabric 3 is impregnated with resin material. Except for the warps 11, which are said to be of "high strength", there are no other reinforcing filaments.

GB 1 354 689 discloses an elastomeric article, which may be a conveyor belt, having a reinforcement comprising an assembly of continuous parallel filaments extending longitudinally. This elastomeric article preferably furthermore comprises a woven fabric reinforcing layer. In Example 3 a reinforced belt is disclosed wherein a carded web of PET staple fibres is saturated with aqueous latex dispersion and "laid on top of and in contact with the parallel filament assembly".

WO 2017/102768 A1 describes a sheet material consisting of an mixture consisting essentially of random-oriented fibres and thermoplastic or thermoplastic elastomer, and its use as a support in punching applications or as top layer in punching belts. The sheet material itself may be made of N geometrically well defined sheets of polymer and K types of fibres, wherein each k-th type of fibre may be in the form of a respective pre-assembled sheet, such as a non-woven fabric.

The present invention seeks to provide an improved belt carcass taking into account all the foregoing facts and problems, which is suitable for preparing different belt types therefrom.

SUMMARY OF THE INVENTION

The invention thus provides:

A belt carcass comprising one, two, or more than two impregnated layers;
characterised in that
i. each impregnated layer comprises or consists essentially of, a non-woven fabric and an impregnation material comprising, or consisting essentially of, a first thermoplastic, first thermoplastic elastomer, first elastomer or first thermoset and optional additives; whereby, if there are two or more such impregnated layers, they are adjacent to each other, and
ii. if the belt carcass comprises one or more such impregnated layers, then reinforcing filaments extending at least in part in one given direction and being in the form of one filament layer are embedded in the non-woven fabric of exactly one of said impregnated layers; or if the belt carcass comprises two or more such impregnated layers, then reinforcing filaments extending at least in part in one given direction and being in the form of exactly one filament layer are sandwiched between two adjacent such impregnated layers.

Preferred embodiments of the belt carcass, processes for its manufacture and embodiments of belts produced therefrom are according to the claims.

DETAILED DESCRIPTION OF THE INVENTION

Figure 1:
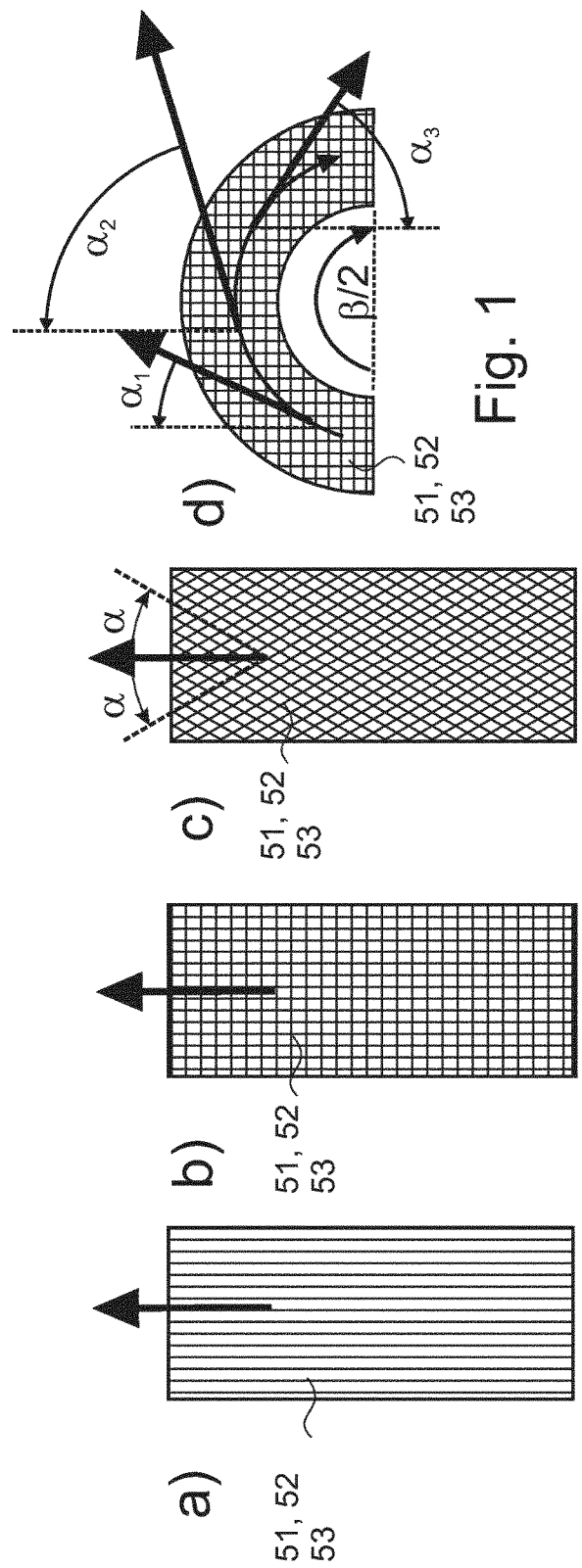
FIG. 1 shows transparent top views of belts containing embedded different embodiments of filament layers of reinforcing filaments.

It has unexpectedly been found that by constructing a belt carcass from one or more layers of impregnated non-woven fabric, wherein either exactly one of the impregnated layers furthermore comprises exactly one embedded filament layer comprising reinforcing filaments running at least in part in a given filament direction, or wherein exactly one filament layer comprising reinforcing filaments running at least in part in a given filament direction is sandwiched between two such impregnated layers, the belts cut from such belt carcass in such a way that said filament direction will form the belt's travel direction, have comparable flexibility with respect to a belt comprising woven fabrics and otherwise identical construction. It was observed that said exactly one filament layer will tend to form the one possible neutral plane of a linear running belt cut out of such belt carcass. It was furthermore found that having the remaining impregnated layers devoid of any embedded reinforcing filaments and not sandwiching any further reinforcing filaments in between them, will provide maximum compressibility on the concave side of the belt and maximum stretchability on the convex side of the belt, thus maximum flexibility, to allow for easy bending around small pulleys. It was still furthermore found that by either embedding such reinforcing filaments into a non-woven fabric of an impregnated layer, or by sandwiching such reinforcing filaments between two adjacent impregnated layers each comprising a non-woven fabric, the above-mentioned longitudinal incision through the impregnation material of the impregnated layers can be prevented. Still furthermore it was found that belts made out of the inventive belt carcass without co-use of any woven fabric traction layer(s) which belts provide a tenacity comparable to a belt having woven fabric traction layer(s). Yet still furthermore it was observed that the inventive belts, simultaneously with retention of tenacity and resistance to delamination of the impregnation, have a reduced noise level during operation, which might be attributed to the total absence of interlacement nodes, due in turn to the absence of woven fabrics (no "washboard" effect as mentioned in US 2008/0164127 A1).

The term "belt carcass" as used herein, means a sheetlike layered composite comprising all required layers, that is, the one filament layer comprising reinforcing filaments and the one, two or more impregnated layer(s) each comprising a non-woven fabric, but said sheetlike layered composite not necessarily yet having the dimensional shape of a conveyor belt. A "belt carcass" as used herein can be cut into one or more belts of the invention of appropriate size and width, with the proviso that in the case of a belt intended for linear travel direction (in the following also a "linear belt") the cutting of the belt(s) is done in such a way that said filament orientation in the one sole filament layer will form the eventual intended travel direction of the linear belt(s) so produced.

In the belt carcass of the invention the reinforcing filaments form one sole filament layer, which is either embedded in the non-woven fabric of one single impregnated layer, or sandwiched between the non-woven fabrics of two adjacent impregnated layers.

The reinforcing filaments form a filament layer which is in a plane which is parallel to the length (y) and width (x) of the belt carcass of the invention (that is, the thickness, z, of the belt carcass is perpendicular to that plane). The vertical position of the filament layer, if it is embedded in a non-woven fabric, is preferably in the range of 20 to 80%, more preferably of 40 to 60%, of the thickness $D_{mp}$ of the non-woven fabric contained therein, wherein $D_{mp}$ is as defined and measured as explained herein below. Such vertical position is easily controlled by appropriately choosing the thicknesses $D_{mp}$ of the first non-woven sublayer and second non-woven sublayer which can be joined together either or by chemical, thermal bonding or mechanically needled together or joined by hydro-entanglement, to form the non-woven fabric with embedded reinforcing filaments, as also explained below.

The one filament layer contains "reinforcing filaments" that are intended to improve the belt's tenacity at least in the belt's travel direction. It is envisaged that these reinforcing filaments are preferably neither interlaced nor interwoven with each other and each have one or more subsections each running essentially straight and without curvature and extending at least in part in one given direction which in a linear belt cut out from that carcass will become the belt's travel direction.

For the purposes of the invention the term "extend at least in part in one given direction" shall mean that a quotient r, calculated from all reinforcing filaments contained in the entire belt as $$r \equiv \frac{\sum_{i=1}^{I}\left(\sum_{k=1}^{K}\left(\frac{T_{ik}L_{ik}}{\rho_{ik}}\cos(\alpha_{ik})\right)\right)}{\sum_{i=1}^{I}\left(\sum_{k=1}^{K}\left(\frac{T_{ik}L_{ik}}{\rho_{ik}}\right)\right)} \quad (1)$$

gives at least 0.5. In formula (1):

$L_{ik}$ (in m) is the length of the k-th straight subsection of the i-th filament (e.g. a length of an individual edge of an individual mesh, that is, a mesh size);

$\rho_{ik}$ (in g/m$^3$) is the density of the material of the k-th straight subsection of the i-th filament;

$\cos(\alpha_{ik})$ is the cosine of the angle that said k-th straight subsection of the i-th-filament has with respect to said one given direction;

$T_{ik}$ (in g/m) is the linear density of said k-th straight subsection of the i-th-filament;

the sums in k run over all K straight subsections of the i-th filament; and the sums in i run over all I reinforcing filaments contained in the belt.

For a layer of reinforcing filaments in the form of one or two arrays of parallel reinforcing filaments (that is, each i-th filament has only one sole straight subsection having a length $L_i$ corresponding to the total length of the i-th filament), formula (1) simplifies to $$r \equiv \frac{\sum_{i=1}^{I}\left(\frac{T_i L_i}{\rho_i}\cos(\alpha_i)\right)}{\sum_{i=1}^{I}\left(\frac{T_i L_i}{\rho_i}\right)} \quad (2)$$

wherein $L_i$ (in m) is the entire length of the i-th filament;

$\cos(\alpha_i)$ is the cosine of the angle that said i-th-filament has with respect to said one given direction;

$\rho_i$ (in g/m$^3$) is the density of the material of the i-th filament;

$T_i$ (in g/m) is the linear density of the i-th-filament; and the sums in i run over all I reinforcing filaments.

In FIGS. 1a), b) and c), showing transparent top views of embodiments of linear belts cut out of the belt carcass, said "one given direction in which the reinforcing filaments extend at least in part", and accordingly also the linear belt's travel direction, is indicated with bold arrows.

Specifically with reference to FIG. 1a): This linear belt contains a filament layer 51 or 52 or 53 in the form of one sole array of parallel reinforcing filaments running over their entire length exactly in the belt's travel direction. In the definitions of above formula (2), all cosines thus are unity (the angle to said belt travel direction is zero), and accordingly r from formula (2) becomes 1, irrespective of the filament linear densities, filament material densities, and filament lengths. Furthermore, the I as defined for formula (2), divided by the linear belt's width, may here be considered as the reinforcing filament count in width direction.

Preferably in the embodiment of FIG. 1a), all reinforcing filaments are identical.

Specifically with reference to FIG. 1b): This linear belt contains a filament layer 51 or 52 or 53 in the form of two arrays of parallel reinforcing filaments, the first array of reinforcing filaments running exactly in the belt's travel direction and the second array running exactly perpendicular thereto. In the definitions of above formula (2) all cosines for the first array are unity (the angle to said belt travel direction is zero), and all cosines for the second array are zero (the angle to said belt travel direction is 90°). Accordingly formula (2) becomes $$r \equiv \frac{\sum_{i=1}^{I}\left(\frac{T_i L_i}{\rho_i}\right)}{\sum_{i=1}^{I}\left(\frac{T_i L_i}{\rho_i}\right)+\sum_{j=1}^{J}\left(\frac{T_j L_j}{\rho_j}\right)} \quad (3)$$

wherein $L_i$ (in m) is the length of the i-th filament running in belt travel direction and $\rho_i$ (in g/m$^3$) is the density of its material;

$L_j$ (in m) is the length of the j-th filament running perpendicular to the belt travel direction and $\rho_j$ (in g/m$^3$) is the density of its material;

$T_i$ and $T_j$ (in g/m) are the linear densities of the i-th-filament running in belt travel direction and the j-th filament running perpendicular to the belt travel direction, respectively;

the sums in i run over all I reinforcing filaments running in belt travel direction;

the sum in j runs over all J reinforcing filaments running perpendicular to the belt travel direction; and the $L_i$, $L_j$, $T_i$, $T_j$, I and J are chosen such that r from formula (3) becomes at least 0.5.

Here, J divided by the linear belt's length may be considered the reinforcing filament count of the belt in length direction, and I divided by the linear belt's width may be considered the reinforcing filament count in width direction.

Alternatively, also with reference to FIG. 1b): This linear belt may also contain a filament layer 51 or 52 or 53 in the form of a square or rectangular grid. Therein two of the opposing edges of each square or rectangular mesh run exactly in the belt's travel direction; all cosines for these edges are unity (their angle to the belt travel direction is zero). The other two opposing edges of each mesh run exactly perpendicular to the belt's travel direction; all cosines for these other edges are zero (their angle to the belt travel direction is 90°). Accordingly formula (1) becomes:

$$r \equiv \frac{\sum_{i=1}^{I}\left(\sum_{k=1}^{K}\left(\frac{T_{ik} L_{ik}}{\rho_{ik}}\right)\right)}{\sum_{i=1}^{I}\left(\sum_{k=1}^{K}\left(\frac{T_{ik} L_{ik}}{\rho_{ik}}\right)\right)+\sum_{j=1}^{J}\left(\sum_{m=1}^{M}\left(\frac{T_{jm} L_{jm}}{\rho_{jm}}\right)\right)} \quad (4)$$

wherein $L_{ik}$ (in m) is the length of the k-th straight subsection of the i-th filament (e.g. a length of an individual edge of an individual mesh, that is, a mesh size) running in the belt's travel direction, and $\rho_{ik}$ (in g/m$^3$) is the density of its material;

$L_{jm}$ (in m) is the length of the m-th straight subsection of the j-th filament (e.g. a length of an individual edge of an individual mesh, that is, a mesh size) running perpendicular to the belt's travel direction, and $\rho_{jm}$ (in g/m$^3$) is the density of its material;

$T_{ik}$ (in g/m) is the linear density of said k-th straight subsection of the i-th-filament;

$T_{jm}$ (in g/m) is the linear density of said m-th straight subsection of the j-th-filament;

the sums in k run over all K straight subsections of the i-th filament running in the belt's direction and being fully contained in the belt;

the sum in m runs over all M straight subsections of the j-th filament running perpendicular to the belt's direction and being fully contained in the belt;

the sums in i run over all I reinforcing filaments running in the belt's travel direction contained in the entire belt; and the sum in j runs over all J reinforcing filaments running perpendicular to the belt's direction contained in the entire belt's width.

The $L_{ik}$, $L_{jm}$, $T_{ik}$, $T_{jm}$ I, J, K and M are chosen such that r from formula (4) becomes at least 0.5.

Here also, J divided by the length of the belt may be considered the filament count of the belt in length direction, and I divided by the belt's width may be considered the filament count in width direction.

In the embodiment of FIG. 1b), preferably all reinforcing filaments running in the belt's travel direction are identical, and all reinforcing filaments running perpendicular to the belt travel direction are identical.

Specifically with reference to FIG. 1c): This linear belt contains a filament layer 51 or 52 or 53 in the form of a grid having rhomboid meshes, in which all mesh edges run in a direction oblique with respect to the belt's travel direction, enclosing a fixed angle $\alpha$ with the belt's travel direction. Accordingly formula (1) becomes:

$$r \equiv \frac{\sum_{i=1}^{I}\left(\sum_{k=1}^{K}\left(\frac{T_{ik}L_{ik}}{\rho_{ik}}\cos(\alpha_{ik})\right)\right)}{\sum_{i=1}^{I}\left(\sum_{k=1}^{K}\left(\frac{T_{ik}L_{ik}}{\rho_{ik}}\right)\right)} = \cos(\alpha)\frac{\sum_{i=1}^{I}\left(\sum_{k=1}^{K}\left(\frac{T_{ik}L_{ik}}{\rho_{ik}}\right)\right)}{\sum_{i=1}^{I}\left(\sum_{k=1}^{K}\left(\frac{T_{ik}L_{ik}}{\rho_{ik}}\right)\right)} = \cos(\alpha) \quad (5)$$

which is irrespective of the linear densities, material densities and edge lengths, and which again must be at least 0.5.

Preferably in this embodiment, each rhomboid mesh has a longer diagonal and a shorter diagonal, wherein the longer diagonal runs in the belt's travel direction and the shorter diagonal runs perpendicular to the belt's travel direction.

Specifically with reference to FIG. 1d): In this corner belt, cut circularly out of the belt carcass of the invention, the filament layer must contain "reinforcing filaments" that improve the tenacity in any direction, because the travel direction is not fixed linear but circular, as indicated by the circular arrow in FIG. 1d). The local travel direction at each (x,y) point of the disk or corner belt is a tangent onto the said circular travel direction, which is indicated for three exemplary (x,y) positions with three bold arrows. A filament layer in the form of a grid with square meshes appears the preferable embodiment here, which in FIG. 1d) is aligned in the x (horizontal) and y (vertical) directions. For any (i,k) square mesh of this grid the one opposing pair of edges along the x-direction will have a fixed angle $\alpha$ with respect to said local belt travel direction and the other opposing pair of edges will have a corresponding fixed angle of 90°-$\alpha$ with respect to said local belt travel direction. Since any (i,k) square mesh is always anything from exactly parallel to said local belt travel direction ($\alpha$=0) to exactly perpendicular to said local belt travel direction ($\alpha$=90°) the angle $\alpha$ of any (i,k) square mesh to said local belt travel direction shall thus be measured such that it is always in the range of 0° to 90°. Furthermore in a square mesh grid the linear density of all filament edges is equal, thus T, their material density is equal, thus $\rho$, and their length is also equal, thus L. For each square mesh, only one edge of each pair may be considered in the summations, in order to avoid double counting of edges. Still furthermore, the product I×J, wherein I and J are as defined in formula (1), may be considered as very close to the number of square meshes fully contained in the circular belt section. The double summation over i and over k in formula (1) will thus be equal to summing over all square meshes fully contained in the circular belt section, with only one edge of each edge pair being considered, as required.

From formula (1) one then obtains $$r \equiv \frac{\sum_{i=1}^{I}\left(\sum_{k=1}^{K}\frac{TL}{\rho}((\cos(\alpha)+\cos(90°-\alpha)))\right)}{\sum_{i=1}^{I}\left(\sum_{k=1}^{K}\left(\frac{TL}{\rho}\right)\right)} = \quad (6)$$

$$\frac{\frac{TLIK}{\rho}(\cos(\alpha)+\sin(\alpha))}{\frac{TLIK}{\rho}} = \cos(\alpha)+\sin(\alpha)$$

which for any $\alpha$ in the said range from 0 to 90° is never less than 1.0, thus more than 0.5, irrespective of T, L and $\rho$.

For the first exemplary positions of FIG. 1d) the vertical (y-running) opposing edges of each mesh enclose an angle $\alpha_1$ of about 35° with the corresponding local belt travel direction and in the second exemplary position these edges enclose an angle $\alpha_2$ of about 30° with the corresponding local belt travel direction. In the third exemplary position these edges enclose an angle $\alpha_3$ of about 40° with the corresponding local belt travel direction, if $\alpha_3$ is measured such that it is in the range of 0° to 90°. The respective angles for the corresponding horizontal (x-running) grid edges of the three exemplary positions are thus 55°, 60° and 50°, respectively.

Each impregnated layer in the belt of the invention preferably consists essentially only of a non-woven fabric and of a the impregnation material, and, as the case may be, of the reinforcing filaments. "Consisting essentially" means in the context of the present invention that the sum of the weight contents of non-woven fabric, impregnation material and reinforcing filaments (if present) preferably makes up at least 97% by weight of the impregnated layer. More preferably, each impregnated layer consists of non-woven fabric and impregnation material and reinforcing filaments (if present).

The impregnation material itself preferably consists essentially of the thermoplastic, thermoplastic elastomer, elastomer or thermoset, and of optional additives. Additives can be added to the impregnation material e.g. in order to impart some colour (dyes or pigments), to act as fillers, to improve abrasion resistance; to increase or decrease the CoF (Coefficient of Friction); to provide flame resistance; and/or to provide visual (luminescence) and/or metal detectability, or can be added in the function of plasticizers. The amount of these named additives with given function can be up to 75% by weight, based on the impregnation material, but is typically in the range of 1 to 25% by weight, based on the impregnation material, provided that type and amount of additive(s) are such that the impregnation material can be softened or molten at some elevated temperature, or otherwise liquefied (e.g. by dissolving or dispersing in a solvent) for at least the time required to impregnate a non-woven fabric with the softened, molten or otherwise liquefied impregnation material.

That the impregnation material "consists essentially" of thermoplastic, thermoplastic elastomer, elastomer or thermoset, and of optional additives preferably means here that the sum of the weight contents of thermoplastic, thermoplastic elastomer, elastomer or thermoset, and of optional above discussed additives preferably makes up at least 95% by weight of the impregnation material, whereby the remainder are other, unnamed components such as impurities. More preferably, the impregnation material consists of thermoplastic, thermoplastic elastomer, elastomer or thermoset, and of optional above discussed additives.

The non-woven fabric(s) used in the belt carcass of the invention are as such conventional. They may in particular be firstly made up of inorganic fibres, such as glass, basalt, carbon or aramid. They may secondly be made up or synthetic organic fibres, such as of polyester (such as PET or PBT), polyolefinic fibres (such as polypropylene or polyethylene), polyamides (such as nylon-6,6), viscose, polyphenylene sulfone or are bicomponent fibres having a higher-melting type of fibres and a lower-melting type of fibres, or core-sheath fibres having a higher-melting core and a lower-melting sheath. The use or co-use of bicomponent fibres, such as in an amount of 50 to 100% by weight based on the total weight of fibres of the non-woven, may improve the tear resistance and elongation resistance (tenacity) of the non-woven and thus the tear resistance and elongation resistance (tenacity) of an inventive belt containing that non-woven. The non-woven fabric(s) may thirdly be made up or natural organic fibres, such as wool, cotton, hemp, ramie, jute, sisal or flax. If there is a plurality of non-woven fabrics in the belt carcass, then it is preferred that the orientation of the fibres in all non-wovens is predominantly in the same direction. This can be easily achieved by carding the non-woven fabrics before they are impregnated and incorporated into the belt carcass.

The weight per unit area of any of these non-woven fabrics is preferably in the range of 50 to 1500 g/m², more preferably in the range of 50 to 400 g/m².

The fibres of the non-woven fabrics preferably have a linear density of 3 to 50 decitex (dtex), more preferably of 5 to 30 dtex and the density of the material of the fibres is preferably in the range of 0.9 to 1.3 g/cm³. Presence or co-presence of fibres, such as in an amount of 50 to 100% by weight based on the total weight of fibres of the non-woven, and having titers in the lower part of these ranges, such as in the range of 3 to 20 decitex, may improve flexibility and resistance to elongation (tenacity) of the non-woven and thus of an inventive belt containing that non-woven. On the other hand, presence or co-presence of fibres, such as in an amount of 50 to 100% by weight based on the total weight of fibres of the non-woven, and having titers in the higher part of these ranges, such as in the range of 30 to 50 decitex, may improve tearing resistance of the non-woven and thus of an inventive belt containing that non-woven. The length of the individual fibres in a non-woven fabric or sublayer thereof is preferably in the range of 15 to 150 mm, more preferably in the range of 30 to 100 mm. This means the individual length of each fibre, not an average length of all fibres. It is therefore intended that essentially all, i.e. at least 95%, of the fibre specimens have such length. The weight ratio of non-woven fabric to impregnation in the impregnated layer(s) is preferably in the range of 30:70 to 80:20.

In the context of the present invention the thickness D of any geometrically well-defined layer or sheet (which includes any isolated impregnated layer(s) and the overall belt carcass of the invention) is directly measured on that layer or sheet and is then designated as $D_m$. The thickness $D_m$ of the belt carcass of the invention is preferably in the range of 0.3 to 5 mm, more preferably in the range of 0.4 to 2 mm.

The thickness of any non-woven fabric or non-woven sub-layer is determined under a certain overpressure (i.e. over atmospheric pressure), exerted perpendicularly onto the surface of the non-woven fabric. This overpressure may e.g. be exerted by the measuring gauge itself or by an additional die that compresses the sheet-like layer or non-woven fabric. For the purposes of measuring the thickness of a non-woven fabric or sublayer thereof in its own right this overpressure may be chosen to be 0.2 bar. For the purposes of defining the correct amount of impregnating material to be employed the applied overpressure in the thickness measurement will however be identical to the overpressure used in the corresponding impregnation step using heat and pressure (see below). A thickness measured under a certain applied pressure is designated in the following as $D_{mp}$.

It is preferred that the amount of impregnation material is such that only the void space in the non-woven fabrics is expelled, such that the non-woven fabrics are completely filled with impregnation material, but that on the other hand no excess of impregnation material is used which would form in the finished belt carcass zones or layers devoid of non-woven fabric. This requires consideration of the overpressure applied in any impregnation step, because the thickness $D_{mp}$ of the non-woven fabric before being impregnated, or upon being impregnated by molten or otherwise liquefied impregnation material, strongly depends on that pressure.

In order to correctly choose the required volume of impregnation material, the following formula (7) is indicated:

$$A \times \sum_{w=1}^{w} \left( {}_wD_{mp} - \frac{{}_wW}{{}_w\rho} \right) = \sum_{s=1}^{s} ({}_sV) \tag{7}$$

wherein:
  A (in m²) is the geometric surface of the impregnated layer(s) that will be prepared;
  ${}_wD_{mp}$ (in m) is the thickness of the w-th non-woven fabric, measured under the same overpressure as applied during impregnation. If the impregnation is done using heat and pressure, the overpressure used to measure ${}_wD_{mp}$ shall be the same as the overpressure used during that heat and pressure impregnation. Alternatively, if the impregnation is done using an aqueous dispersion of the impregnation material, the overpressure used to measure ${}_wD_{mp}$ shall be only 0.2 bar;
  ${}_wW$ (in g/m²) is the weight per unit area of the w-th non-woven fabric;
  ${}_w\rho$ (in g/m³) is the density of the fibre material of the w-th non-woven fabric at the temperature used in the impregnation;
  the sum in w runs over all non-woven fabrics to be used;
  ${}_sV$ (in m³) is the volume of the s-th impregnation material to be used at the temperature used in the impregnation; and
  the sum in s runs over all S used impregnation materials.

Thus, if an one-step impregnation/bonding of several non-woven fabrics is chosen, to form in a single step the belt carcass of the invention, above A will also be the geometric surface of the carcass to be formed.

Alternatively, if a sequential build-up is chosen, then above formula (7) is to be applied only to the one non-woven fabric and the one impregnation material that will be used in the one sequential impregnation/build-up step. W and S are then equal to 1.

Exemplary thermoplastics or thermoplastic elastomers for the impregnation material may be selected from one of the customarily known subgroups i) styrenic block copolymers (TPE-s), ii) thermoplastic (co)polyolefins and blends thereof (TPO), iii) elastomeric alloys (TPE-v or TPV), iv) thermoplastic polyurethanes (TPU), v) thermoplastic copolyesters and vi) thermoplastic polyamides.

Exemplary elastomers for the impregnation material are natural rubber, polyisoprene, polybutadiene, styrene-butadiene rubber (SBR), nitrile-butadiene rubber (NBR), ethylene-propylene-diene rubber (EPDM), polyurethanes and acrylate rubbers. Preferably, the elastomer has not yet been vulcanized or crosslinked when used as impregnation material, but may be vulcanized or crosslinked during that impregnation step, especially when using heat and pressure. In order to do that, the elastomer may contain pre-admixed vulcanizing agents in appropriate amounts. Such vulcanizing agent will for the purposes of calculating weight amounts in the impregnated layer be considered as an optional additive with given function.

Exemplary thermosets for the impregnation material are polymers or resins that crosslink and cure upon heat, but other than the above elastomers. Examples are adducts of phenol-/cresol-formaldehyde (novolacs) with epoxies (such as epichlorhydrin), urea/formaldehyde resins, melamine resins, silicone resins, polyimides, bismaleimides and benzoxazines. These resins are preferably used in the uncured A-stage or in the partially cured B-stage, care being taken that during the impregnation no curing to a C-stage occurs. The molecular weight of the starting resins and the degree of curing should preferably be controlled such that the cured resin is still flexible enough.

More preferred are on the one hand TPU's (such as those made of 1) hard segments obtained by reacting aromatic diisocyanates (such as isomeric 2,2'-, 2,4' or 4,4'-diphenylmethane diisocyanate) with aliphatic chain extenders (e.g. $C_2$-$C_6$-diols, such as ethylene glycol, 1,3-propanediol, 1,4-butanediol, 1,5-pentanediol, 1,6-hexanediol, 1,2-propanediol, 2-methylpropanediol, 1,3-butanediol, 2,3-butanediol, 1,3-pentanediol, 1,2-hexanediol and 3-methylpentane-1,5-diol, or glycol ethers, such as diethylene glycol, dipropylene glycol and tripropylene glycol, and aminoalcohols such as ethanolamine, N-methyldiethanolamine) and 2) aliphatic polyester polyols or polyether polyols as soft segments) or TPO's (such as those selected from the group consisting of ii-1) homo- and copolymers of vinylic monomers of the structure $XHC=CH_2$, wherein X is selected from the group consisting of chloro, acetoxy, phenyl and cyano, and the copolymerised monomer (for copolymers) is ethylene and/or propene; and ii-2) ethylene-alpha-olefin copolymers, wherein the alpha-olefin is preferably selected from the group consisting of propene, 1-butene, 1-hexene, 1-heptene and 1-octene).

In one embodiment all impregnated layers of the carcass of the invention contain the same impregnation material, which preferably then also comprises a thermoplastic or thermoplastic elastomer, in particular a TPU.

The preparation of the belt carcass of the invention may be done in several ways, three preferred ways being exemplified in the following with reference to FIGS. 1, 2 and 3. These figures illustrate the preferred way of impregnating the non-woven fabrics with pre-formed sheets of impregnation material. However in the following description whenever possible other impregnation methods will be mentioned as alternative thereto.

Figure 3:
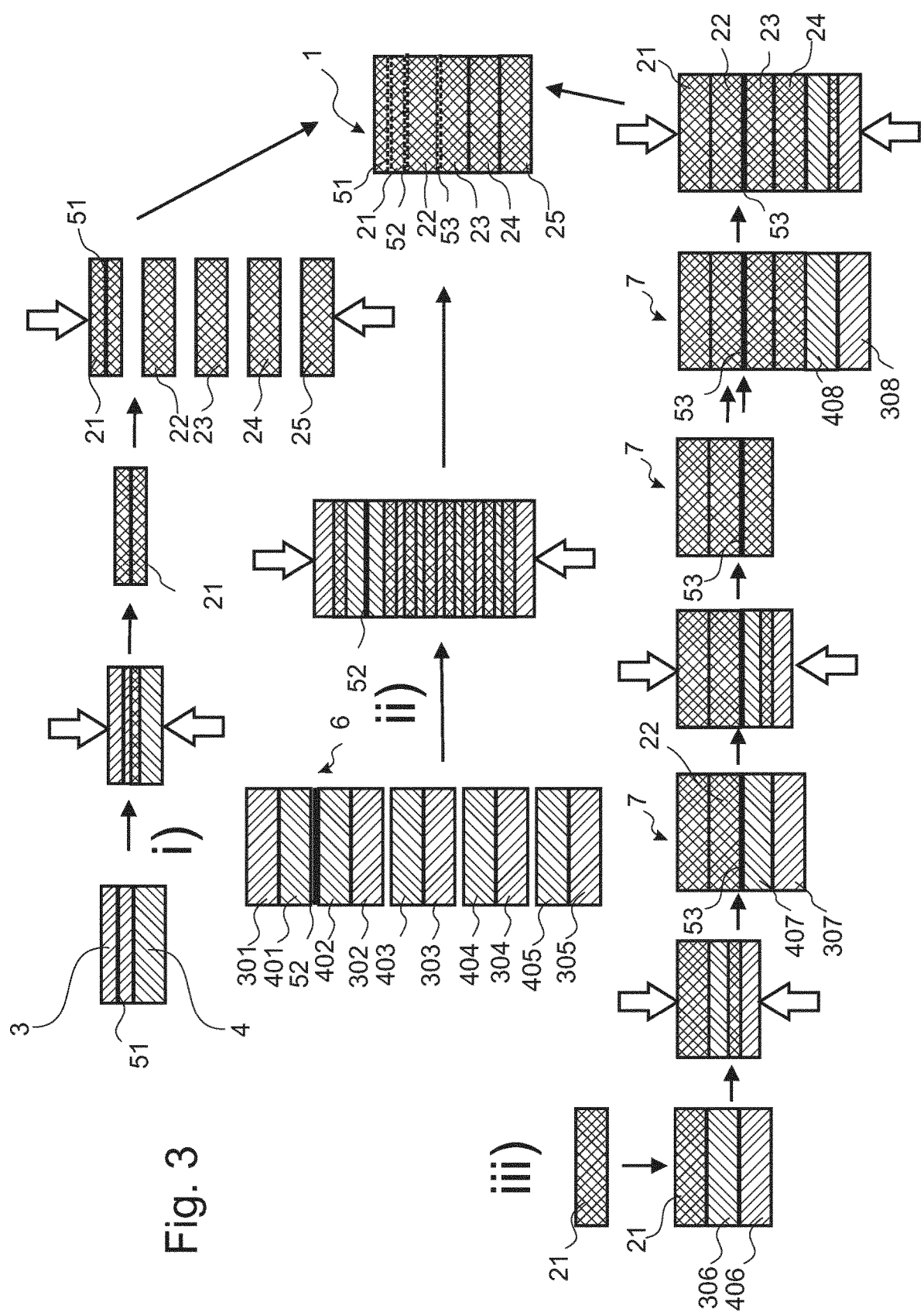
FIG. 3 shows different process embodiments for producing the belt carcass of the invention.

Generally, for all variants of FIG. 3, any bottom left to top right hatchings indicate cross-sections through sheets of impregnation material, any top left to bottom right hatchings indicate cross-sections through non-woven fabrics, and any crosshatchings indicate zones or layers where non-woven fabric has been, or is being, impregnated by impregnation material. Any thick vertical arrows indicate bonding with use of heat and pressure.

The first variant i) of FIG. 3 exemplifies a process where exactly one filament layer 51, being embedded in one impregnated layer 21, is used. This variant comprises the following steps:

Step i-1): Firstly, a first non-woven sublayer 31, a second non-woven sublayer 32 and a filament layer 51 containing reinforcing filaments, extending at least in part in one given direction, are provided. The two sublayers 31,32 contain above described fibres suitable for a non-woven fabric and as such are conventional. They may optionally be carded to impart a more uniform fibre orientation, preferably such that the fibre orientation in the two sublayers 31,32 is the same. The reinforcing filaments are oriented beforehand such that they are oriented at least in part in one given direction, or are directly provided with such orientation.

Figure 2:
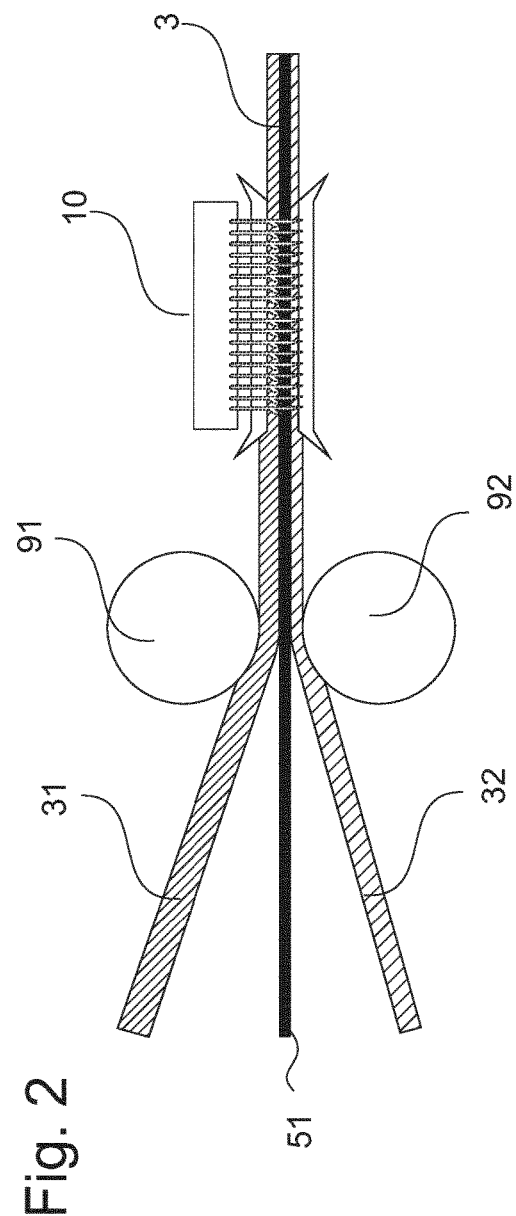
FIG. 2 shows a schematic process for the preparation of a non-woven fabric containing an embedded filament layer of reinforcing filaments.

Step i-2), i-3), also with reference to FIG. 2, the filament layer 51 is arranged, in particular laid, atop of the second non-woven sublayer 32 and the first non-woven sublayer 31 atop of the filament layer 51. First non-woven sublayer 31, filament layer 51 and second non-woven sublayer 32 are pressed together e.g. using two compressing rolls 91,92. Their joining together may then be done e.g. and preferably by needling, as shown in FIG. 2 by the needling apparatus 10. Alternatively they may be joined together by chemical means (thermosetting adhesive), thermal bonding (hotmelt adhesive) or mechanically (stitched or otherwise mechanically joined together), or bonded together by so-called hydro-entangling. Needling or hydro-entangling further randomizes the direction of the non-woven fibres in the z-direction (normal to the length (y) and width (x) of the non-woven fabric).

In step i-4) the first non-woven fabric 3 is impregnated with a first impregnation material 4 comprising, or consisting essentially of, a first thermoplastic, first thermoplastic elastomer, first elastomer or first thermoset and optional additives as outlined above, to form a first impregnated layer 21 with the embedded filament layer 51. This impregnation step may either be done using a preformed sheet of the first impregnation material (as shown in FIG. 3) using a calendar or extruder. It may also be done using an aqueous dispersion of the first impregnation material. Here, several successive applications of the aqueous dispersion may be applied e.g. by doctor blade, kiss coating, spraying or dipping, with intermediate drying after each application, before the first impregnation material is optionally softened by heat and pressure and/or vacuum to fully penetrate the non-woven fabric. As a still further alternative, the impregnation material may be applied as a powder or by flocculation onto the non-woven fabric 3, and the deposited particles of impregnation material are then sintered together and impregnated into the non-woven fabric 3 using heat and optionally pressure.

Within step i-5) there are two subvariants: The first subvariant, comprising steps i-5-a) to i-5-c) (not illustrated in FIG. 3 but analogous to embodiment ii) shown in FIG. 3) and the second subvariant comprising steps i-5-d) to i-5-e).

In the first subvariant, step i-5-a) is to provide one or more further non-woven fabrics and one or more further sheets of a further impregnation material each comprising, or consisting essentially of, a further thermoplastic, further thermoplastic, further elastomer or further thermoset and optional additives as exemplified above. Since in the overall belt carcass there is only one layer of reinforcing filaments and these were already introduced in steps i-2) and i-3), then accordingly any such further non-woven fabrics are devoid of reinforcing filaments. The total volume of impregnation material provided by the further sheets, and the weight per area and thicknesses $D_{mp}$ and material densities of each non-woven fabric are preferably chosen such that the total void volume of all further non-woven fabrics can be filled with impregnation material, but without forming zones or layers devoid of non-woven fabric (see calculations with above formula (7)). This may in one embodiment mean that the number of further non-woven fabrics is equal to the number of further sheets, but this need not be the case.

Step i-5-b) is arranging said one or more further non-woven fabrics and said one or more further sheets adjacent to said first impregnated layer 21 and adjacent to each other, such that immediately adjacent to any non-woven fabric there is at least one further sheet, and immediately adjacent to any further sheet there is at least one further non-woven fabric. This facilitates uniform and complete impregnation of the non-woven fabrics by the impregnation material from the at least one adjacent sheet. The total number of further sheets, their total volume of impregnation material they provide, and the weight per area and thicknesses $D_{mp}$ and material densities of all further non-woven fabrics are preferably chosen such that the total void volume of all further non-woven fabrics on the one side of the first impregnated layer 21 can be filled with impregnation material (see calculations with above formula (7)). Likewise the total number of further sheets, their total volume of impregnation material they provide, and the weight per area and thicknesses $D_{mp}$ and material densities of all further non-woven fabrics are preferably chosen such that the total void volume of all further non-woven fabrics on the other side of the first impregnated layer 21 can be filled with impregnation material. Here again, this may mean that the numbers of sheets and non-woven fabrics are equal on each of the two sides of the first impregnated layer 21.

In step i-5-c) with use of heat and pressure any further non-woven fabrics are impregnated by impregnation material from the at least one further sheet immediately adjacent to that non-woven fabric. This normally means to use a calendar, hot press or a Rotocure. The applied overpressure shall preferably be the one as used in the above determinations of $D_{mp}$. The simultaneous impregnation and bonding together by heat and pressure is also done at a temperature sufficiently high that the thermoplastic, thermoplastic elastomer or B-staged resin melts, rather than simply softens. Only if the impregnation material is essentially molten it has sufficiently low viscosity to penetrate all voids in the adjacent non-woven fabric(s), to form an impregnated layer. "Essentially molten" may preferably mean in the context of the invention that the melt has at the chosen impregnating temperature a MFI at 8.7 kg of at least 20 g/10 min, preferably of at least 30 g/10 min, and most preferably 30 to 60 g/10 min. In each case this is with the proviso that the temperature is kept sufficiently low to avoid decomposition of the impregnation material, and, if a thermoset is used in the impregnation material, the impregnation is essentially complete with the thermoset not curing further than to the B-stage, and not the C-stage.

In step i-5-d) of the second subvariant one or more further preformed impregnated layers 22, 23, 24, 25, each comprising or consisting of a further non-woven fabric impregnated with a further impregnation material comprising, or consisting essentially of, a further thermoplastic, further thermoplastic elastomer, further elastomer or further thermoset and optional additives, as outlined above, are directly provided. These may have been preformed from a respective non-woven fabric and impregnation material by any of the procedures outlined above for step i-4). Since in the overall belt carcass there is only one layer of reinforcing filaments and these were already introduced in steps i-2) and i-3), then accordingly any such further impregnated layers 22, 23, 24, 25 are devoid of reinforcing filaments.

In step i-5-e) the one or more further impregnated layers 22, 23, 24, 25 are arranged adjacent to the first impregnated layer 21 and adjacent to each other; and any such further impregnated layers 21, 22, 23, 24, 25 and the first impregnated layer 21 are bonded with use of heat and pressure together. The conditions and apparatuses may be as outlined above under step i-5-c). Curing to the final C stage may be allowed to happen here, if the impregnation(s) are made up of an impregnation material comprising a thermoset in the A- or B-stages.

In step i-5) the number of non-woven fabrics (first subvariant) or the number of impregnated layers (second subvariant) present on each side of the first impregnated layer 21 is preferably chosen such that the first impregnated layer 21 containing the embedded filament layer 51 will preferably be near or at the neutral plane of a linear belt cut out from the belt carcass, once the belt will be in use. This means that e.g. for a linear belt which always has the same belt surface facing all pulleys the first impregnated layer will preferably be at the inner concave side of the belt and will face the pulleys, whereas all other impregnated layers 22, 23, 24, 25 will preferably be arranged on the outside of the first impregnated layer 21, and will be facing away from the pulleys.

The second variant ii) of FIG. 3 exemplifies a process where the belt carcass 1 is formed using exactly one filament layer 52, being sandwiched between two impregnated layers 21,22. This variant comprises the following steps:

In step ii-1) a first non-woven fabric 301; a second non-woven fabric 302; a first sheet 401 of a first impregnation material comprising, or consisting essentially of, a first thermoplastic, first thermoplastic elastomer, first elastomer or first thermoset and optional additives as outlined above; a second sheet 402 of a second impregnation material comprising, or consisting essentially of, a second thermoplastic, second thermoplastic elastomer, second elastomer or second thermoset and optional additives as outlined above; and reinforcing filaments in the form of a filament layer 52, extending at least in part in one given direction, are provided. The reinforcing filaments are oriented beforehand such that they are oriented at least in part in one given direction, or are directly provided with such orientation. Preferably, the total volume of impregnation material provided by the first and second sheets 401,402 and the weight per area and thicknesses $D_{mp}$ and material densities of the two non-woven fabrics 301,302 are chosen such that the total void volume of the two non-woven fabrics 301,302 can be filled with impregnation material (see calculations with above formula (7)).

In step ii-2) the filament layer 52, the first and second non-woven fabrics 301,302 and the first and second sheets 401,402 are arranged adjacent to each other, such that on the one side of the filament layer 52 there is at least one first non-woven fabric 301 and at least one first sheet 401, and on the other side of said filament layer 52 there is at least one second non-woven fabric 302 and at least one second sheet 402, so as to sandwich the filament layer 52 between first non-woven fabric 301 and first sheet 401 on the one hand, and second non-woven fabric 302 and second sheet 402 on the other hand; to form a layered composite 6. Preferably the first and second sheets 401,402 face towards the filament layer 52 and the first and second non-woven fabrics 301,302 sandwich the combination first sheet 401/filament layer 52/second sheet 402, and the total volume of impregnation material provided by the first and second sheets 401,402 and the weight per area and thicknesses $D_{mp}$ and material densities of the two non-woven fabrics 301,302 are chosen such that the total void volume of the two non-woven fabrics 301,302 can be filled with impregnation material from the first and second sheets 401,402 (see calculations with above formula (7)). This ensures that the filament layer 52 is, and remains, surrounded by molten impregnation material during the later impregnation/bonding step ii-3-c) with heat and pressure, and thus avoids distortion or disruption of the filament layer 52 by any adjacent non-woven fabrics.

Within step ii-3) there are two subvariants: The first subvariant, comprising steps ii-3-a) to ii-3-c) and the second subvariant comprising steps ii-3-d) to ii-3-f).

In the first subvariant, step ii-3-a) is to optionally provide one or more further non-woven fabrics 303, 304, 305 and one or more further sheets 403, 404, 405 of a further impregnation material comprising, or consisting essentially of, a further thermoplastic, further thermoplastic, further elastomer or further thermoset and optional additives as outlined above (as directly shown in FIG. 3). The total number of all further sheets 403, 404, 405, their total volume of impregnation material they provide, and the weight per area and thicknesses $D_{mp}$ and material densities of all further non-woven fabrics 303, 304, 305 are preferably chosen such that the total void volume of all further non-woven fabrics 303, 304, 305 can be filled with impregnation material (see calculations with above formula (7)). This may mean that the number of further non-woven fabrics 303, 304, 305 is equal to the number of further sheets 403, 404, 405, but this need not be the case.

In step ii-3-b) the optional one or more further non-woven fabrics 303, 304, 305 and the one or more further sheets 403, 404, 405 are arranged adjacent to the layered composite 6 of step ii-2) and adjacent to each other, such that immediately adjacent to any non-woven fabric there is at least one further sheet, and immediately adjacent to any further sheet there is at least one further non-woven fabric. This facilitates uniform and complete impregnation of the non-woven fabrics by the impregnation material from the at least one adjacent sheet. Preferably here, on each side of the layered composite 6 the number of further non-woven fabrics is equal to the number of further sheets.

In step ii-3-c), using heat and pressure, simultaneously any non-woven fabrics 301 or 302 or 303 or 304 or 305, respectively, are impregnated by impregnation from the at least one further sheet immediately adjacent to that non-woven fabric 401 or 402 or 403 or 404 or 405, respectively, using heat and pressure, to form a respective impregnated layer 21 or 22 or 23 or 24 or 25, respectively; and all such impregnated layers 21, 22, 23, 24, 25 and said layered composite 6 are bonded together. The conditions and apparatuses may be as outlined above under step i-5-c). Curing to the final C stage may be allowed to happen here, if the impregnation(s) are made up of an impregnation material comprising a thermoset in the A- or B-stages.

In the second subvariant step ii-3-d) is to optionally provide one or more further impregnated layers each further impregnated layer comprising or consisting of a further non-woven fabric impregnated with a further impregnation material each comprising, or consisting essentially of, a further thermoplastic, further thermoplastic, further elastomer or further thermoset and optional additives as outlined above and being devoid of reinforcing filaments. This subvariant is not directly shown in ii) of FIG. 3 but is analogous to the provision of the impregnated further layers 22, 23, 24, 25 of variant i) shown in FIG. 3. These optional further impregnated layers 22, 23, 24, 25 may have been prepared beforehand by any of the procedures outlined above for step i-4).

Step ii-3-e) is to arrange the optional one or more further impregnated layers 22, 23, 24, 25 adjacent to the layered composite 6 of step ii-2) and adjacent to each other; and in step ii-3-f) any such optional further impregnated layers 21, 22, 23, 24, 25 and said layered composite 6 are bonded together using of heat and pressure. The conditions and apparatuses may be as outlined above under step i-5-c). Curing to the final C stage may be allowed to happen here, if the impregnation(s) are made up of an impregnation material comprising a thermoset in the A- or B-stages.

As in step i-5) above, in step ii-3) the number of further non-woven fabrics (first subvariant) or the number of further impregnated fabrics (second subvariant) arranged on each side of the layered composite 6 may be chosen such that the filament layer 52 is at or near the neutral plane of the finished belt and the intended final use of the belt, for the reasons outlined above under step i-5).

The third variant iii) of FIG. 3 exemplifies a process where a belt carcass 1 is formed using exactly one filament layer 53, being sandwiched between two impregnated layers 22,23, and the belt carcass is built up sequentially, until a desired number of impregnated layers, or a desired belt carcass thickness, is achieved. This variant allows for the direct formation of an endless belt carcass of the invention, because the first impregnated layer 21 and then the bonded layered composite 7 may be formed as an endless loop onto which the subsequent impregnated layers are wound up and bonded thereto. This third variant comprises the following steps:

In step iii-1) there are provided reinforcing filaments in the form of a filament layer 53, extending at least in part in one given direction, and one first impregnated layer 21 comprising or consisting of a first non-woven fabric being impregnated with a first impregnation material comprising, or consisting essentially of, a first thermoplastic, first thermoplastic elastomer, first elastomer or first thermoset and optional additives as outline above, but being devoid of reinforcing filaments. The reinforcing filaments are oriented beforehand such that they are oriented at least in part in one given direction, or are directly provided with such orientation. The impregnated layer 21 may have been prepared beforehand by any of the procedures described above in step i-4), with the proviso that the used non-woven fabric is devoid of reinforcing filaments.

Within step iii-2) there are two subvariants: The first subvariant, comprising steps iii-2-a) to iii-2-d) and the second subvariant comprising steps iii-2-e) to iii-2-h).

In the first subvariant, step iii-2-a) is to provide one or more further non-woven fabrics 306, 307, 308 and one or more further sheets 406, 407, 408 of a further impregnation material comprising, or consisting essentially of, a further thermoplastic, further thermoplastic elastomer, further elastomer or further thermoset and optional additives as outlined above. Here, the number of further non-woven fabrics 306, 307, 308 must be equal to the number of further sheets 406, 407, 408, because the belt is built up sequentially, with each build-up cycle using exactly one further non-woven fabric 306, 307, 308 and exactly one further sheet 406, 407, 408, to form a successive further impregnated layer adhering to the bonded layered composite 7. This number is an integer designated as K, which must be at least 1 and may go arbitrarily high. Preferably however K is in the range of 1 to 5.

In step iii-2-b) one of said further non-woven fabrics 306, one of said further sheets 406 and optionally said filament layer 53, are arranged on one side of, and adjacent to, the first impregnated layer 21, such that, if the filament layer 53 is provided, it is sandwiched between said first impregnated layer 21 on the one hand and by the further non-woven fabric 306 and further sheet 406 on the other hand. Preferably, the volume of impregnation material provided by the further sheet 406 and the weight per unit area and thickness $D_{mp}$ and material density of the further non-woven fabric 306 are chosen such that the void volume of the further non-woven fabric 306 can be filled with impregnation material from the further sheet 406 (see calculations with above formula (7)). Preferably here, the sandwiching of the optional filament layer 53 is such that on one side of the filament layer 53 there is the first impregnated layer 21 and on the other side the further sheet 406, and the further non-woven fabric 306 is on the further sheet 406 and faces away from the filament layer 53. This ensures that during the simultaneous impregnating and adhering step iii-3-c) with heat and pressure (see immediately below) the filament layer 53 is, and remains, surrounded by softened impregnation material, and thus avoids distortion or disruption of the filament layer 53 by any adjacent non-woven fabrics.

In step iii-2-c) simultaneously with use of heat and pressure the further non-woven fabric 306 is impregnated by the impregnation material from the further sheet 406, to form a further impregnated layer 22, and the first impregnated layer 21, the optional sandwiched filament layer 53 and the further impregnated layer 22 are bonded together; to form a bonded layered composite 7. The conditions and apparatuses may be as outlined above under step i-5-c).

Step iii-2-d) is to repeat on said bonded layered composite 7 above steps iii-2-b) and iii-2-c) for K−1 times, using further pairs 307/407, 308/408 of further non-woven fabric and further sheet of further impregnation material; provided that in steps iii-2-b) and iii-2-c) and in said repetitions thereof the filament layer (53) is used in total exactly once. Preferably, the total volume of impregnation material provided by each further sheet 407,408 and the weight per area and thicknesses $D_{mp}$ and material densities of each corresponding further non-woven fabric 307,308 is chosen such that the void volume of each further non-woven fabric 307,308 can be filled with impregnation material from the respective further sheet 407,408 (see calculations with above formula (7)). Here again, if in any repetition of steps iii-2-b) and iii-2-c) the filament layer 53 is used, the sandwiching of the optional filament layer 53 is preferably such that on one side of the filament layer 53 there is the bonded layered composite 7 and on the other side the further sheet 407 or 408, and the further non-woven fabric 306 or 307 is on the further sheet 407 or 408 and faces away from the filament layer 53. The reasons for this layer ordering is as given for step iii-2-b) above. Performing K−1 repetitions may mean zero repetitions, because K is at least 1. In this case where K=1, the filament layer 53 must have been employed in steps iii-2-b) and iii-2-c) themselves.

Either after step iii-2-c) (if K=1) or during the last repetition of steps iii-2-b) and iii-2-c) (if K>1) curing to the final C stage may be allowed to happen here, if the impregnation(s) are made up of an impregnation material comprising a thermoset in the A- or B-stages.

In the second subvariant step iii-2-e) is to provide one or more further impregnated layers 22, 23, 24, 25 each comprising or consisting of a further non-woven fabric being impregnated with a further impregnation material comprising, or consisting essentially of, a further thermoplastic, further thermoplastic elastomer, further elastomer or further thermoset and optional additives as outlined above. This subvariant is not directly shown in iii) of FIG. 3 but is analogous to the provision of the impregnated further layers 22, 23, 24, 25 in variant i) shown in FIG. 3. These further impregnated layers 22, 23, 24, 25 may have been prepared beforehand by any of the procedures outlined above for step i-4). All these further impregnated layers are again devoid of reinforcing filaments, because the belt shall comprise only one layer of reinforcing filaments in total, which is the filament layer 53. The number of provided further impregnated layers is again designated as K, which is an integer number which must be at least 1 and may go arbitrarily high. Preferably however K is in the range of 1 to 5.

In step iii-2-f) one further impregnated layer 22 is arranged on one side of, and adjacent to, the first impregnated layer 21, such that, if the filament layer 53 is also provided, it is sandwiched between the first impregnated layer 21 on the one hand and by the second impregnated layer 22 on the other hand.

In step iii-2-g) the first impregnated layer 21, the optional sandwiched filament layer 53 and the further impregnated layer 21 are bonded together with use of heat and pressure; to form a bonded layered composite 7. The conditions and apparatuses may be as outlined above under step i-5-c).

Step iii-2-h) is to repeat on said bonded layered composite 7 above steps iii-2-f) and iii-2-g) for K−1 times, using in each repetition one of said further impregnated layers 23, 24, 25, provided that in steps iii-2-f) and iii-2-g) and in said repetitions thereof the filament layer 53 is used in total exactly once. This is again in view of having in the overall belt only one layer of reinforcing filaments, which is the filament layer 53. Performing K−1 repetitions may mean zero repetitions, because K is at least 1. In this case where K=1, the filament layer 53 must have been employed in steps iii-2-f) and iii-2-g). Either after step iii-2-g) (if K=1) or during the last repetition of steps iii-2-f) and iii-2-g) (if K>1) curing to the final C stage may be allowed to happen here, if the impregnation(s) are made up of an impregnation material comprising a thermoset in the A- or B-stages.

In the third variant iii) of FIG. 3 the filament layer 53 is preferably used in that sequential build-up step that will provide a sandwiched filament layer 53 being near, or at the neutral plane of a linear belt cut out from the belt carcass during its use, for the reasons outlined above under step i-5).

In all process variants of the invention the filament orientation which was present in the initial filament layer 51, 52, 53 will constitute the longitudinal direction of the belt, that is the belt's travel direction. This means that, if the belt formed according to the invention needs to be cut to size such as to have two lateral sides being spaced apart by a desired belt width, then such lateral side cutting will have to be done such that it is parallel to said filament orientation. wherein said filament direction will form said belt's travel direction.

In all three variants i), ii) and iii) of FIG. 3 adjacent layers may be bonded together by heat and pressure either without co-use of an adhesive. This is in particular possible if the impregnations that are to be bonded together are made of chemically compatible thermoplastics or thermoplastic elastomers. Alternatively an adhesive or primer may be used to bond two chemically incompatible impregnations together.

The belt carcass of the invention is suitable for cutting, stamping or punching out of it linear conveyor belts, machine tapes, power transmission belts or spindle tapes, of given length and width. It is also suitable for cutting, stamping or punching a rotating conveying disk or a corner belt out of it. In the case of a linear belt, the cutting shall be done such that the given direction in which the reinforcing filaments in the filament layer of the belt carcass of the invention extend at least in part, shall be, or become, the longitudinal travel direction of the linear belt. Here, the shape of the filament layer may be any such shape, provided that the reinforcing filaments fulfil above equation (1). For a circular disk or corner belt, it appears preferable that the belt carcass contains a filament layer in the form of a grid of square meshes.

Either the belt carcass of the invention, or the belts or disks obtained therefrom, may optionally be further coated with top cover layer imparting the belt or belt carcass appropriate advantageous properties, such as chemical resistance, antibacterial properties, hydrophobicity, different coefficients of friction, or a combination of these. This top cover layer may preferably be adhered to the belt carcass or belt obtained therefrom using a thermosetting (crosslinking) adhesive such as polyurethane, rubber, rubber mixtures and phenol-formaldehyde resin, being compatible with the materials to be bonded together. As an alternative or in addition thereto, the surface of the outermost impregnated layer of the belt carcass or belt (the surface that will face the good to be conveyed) can be provided by embossings or surface profilings that impart that surface properties, in particular adhesion and/or frictional properties, needed for the respective application. Such embossing or profiling may in particular entail the provision of discrete, longitudinally running surface sections with differing static coefficient of friction, said surface sections being arranged in belt's transversal direction adjacent to each other. The application of such top cover layers and profilings or embossing as such is conventional and well known to the skilled person.

The belt of the invention can be made endless using any end-joining technique known in the art, such as mechanical joining, or the fingered joining technique, either using a thermoplastic or thermoplastic elastomer material from one or more of the impregnated layers as hotmelt adhesive, or with co-use of such a hotmelt adhesive.

The belt of the invention can be used in any conveying application in which prior art belts have been used, such as conveyor belts, machine tapes, power transmission belts or spindle tapes.

A first preferred application is however a so called "transfer belt". This is a belt that conveys goods from one first main belt to another main belt in the vicinity, but not immediately adjacent to, the first main belt. To do this, a transfer belt is customarily mounted on a conveying support having two ends in the form of so-called "transfer tails", which are belt turning points having on their top side a pulley of extremely small diameter, or even only a nosebar, such as to allow the transfer belt to convey the goods until very close from and to the said main belts.

A second preferred application are so-called "corner belts". This is an application where a circular belt is cut out of the belt carcass of the invention, as a circular arc section of given section angle β, and the ends of the arc section are joined to make the endless corner belt. The finished corner belt will in use have a circular belt travel direction, moving along the said circular arc, and its path length will be close to the radius of the circular arc multiplied by β/2. That is e.g. cutting out of the belt carcass a circular arc section with β=π (=180°) and given radius r, and joining the ends, will provide a circular corner belt with path length close to π/2*r. For this application, the belt carcass of the invention will preferably contain one filament layer in the form of a web with square meshes.

The invention claimed is:

1. An endless transfer belt, conveyor belt, machine tape, power transmission belt or spindle tape, comprising a belt carcass (1) comprising one, two or more impregnated layers (21, 22, 23, 24, 25), wherein
   i. each impregnated layer (21, 22, 23, 24, 25) comprises, or consists essentially of, a non-woven fabric (3, 301, 302, 303, 304, 305, 306, 307, 308) of fiber specimens wherein at least 95% of said fiber specimens have a length in the range of 15 to 150 mm and an impregnation material (4, 401, 402, 403, 404, 405, 406, 407, 408) comprising, or consisting essentially of, a first thermoplastic or first thermoplastic elastomer and optional additives, the impregnation material completely filling the non-woven fabric and whereby, if there are two or more such impregnated layers (21, 22, 23, 24, 25), they are adjacent to each other;
   ii. if the belt carcass (1) comprises one or more such impregnated layers (21, 22, 23, 24, 25), then reinforcing filaments extending at least in part in one given direction and being in the form of one filament layer (51) are embedded in the non-woven fabric (3) of exactly one of said impregnated layers (21); or
   if the belt carcass (1) comprises two or more such impregnated layers (21, 22, 23, 24, 25), then reinforcing filaments extending at least in part in one given direction and being in the form of exactly one filament layer (52,53) are sandwiched between two adjacent such impregnated layers (21/22, 24/25); and
   iii. the belt carcass (1) is devoid of woven fabrics;
said endless transfer belt, conveyor belt, machine tape, power transmission belt or spindle tape being obtained by cutting a linear belt of a desired width and length out of said belt carcass (1) in such a way that said one given direction into which the reinforcing filaments extend at least in part is in the length direction of the cut linear belt and the transfer belt, conveyor belt, machine tape, power transmission belt or spindle tape is made endless using the thermoplastic or thermoplastic elastomer of the impregnation material (4, 401, 402, 403, 404, 405, 406, 407, 408) as a hotmelt adhesive.

2. The endless transfer belt, conveyor belt, machine tape, power transmission belt or spindle tape as claimed in claim 1, wherein in the belt carcass (1) said filament layer (51) is embedded in the non-woven fabric(s) of exactly one of said impregnated layers (21), and comprises 1 to 8 impregnated layers (21, 22, 23, 24, 25).

3. The endless transfer belt, conveyor belt, machine tape, power transmission belt or spindle tape as claimed in claim 1, wherein in the belt carcass (1) said filament layer (52,53) is sandwiched between two adjacent impregnated layers (21/22, 24/25) and comprises 2 to 8 impregnated layers (21, 22, 23, 24, 25).

4. The endless transfer belt, conveyor belt, machine tape, power transmission belt or spindle tape as claimed in claim 1, wherein in the belt carcass (1) said filament layer (51, 52,

53) comprises reinforcing filaments in the form of a first array of parallel reinforcing filaments.

5. The endless transfer belt, conveyor belt, machine tape, power transmission belt or spindle tape as claimed in claim 4, wherein in the belt carcass (1) the filament layer (51, 52, 53) furthermore comprises a second array of parallel reinforcing filaments running perpendicularly to the filaments of the first array.

6. The endless transfer belt, conveyor belt, machine tape, power transmission belt or spindle tape as claimed in claim 1, wherein in the belt carcass (1) the filament layer (51, 52, 53) is in the form of a grid of reinforcing filaments having square or rectangular meshes.

7. The endless transfer belt, conveyor belt, machine tape, power transmission belt or spindle tape as claimed in claim 1, wherein in the belt carcass (1) the filament layer (51, 52, 53) is in the form of a grid having rhomboid meshes.

8. The endless transfer belt, conveyor belt, machine tape, power transmission belt or spindle tape as claimed in claim 1, wherein in the belt carcass (1) either all impregnated layers (7, 21, 22, 23, 24, 25) contain the same impregnation material, or the impregnated layers (7, 21, 22, 23, 24, 25) contain different impregnation materials.

9. A process for the manufacture of the belt carcass of claim 1 comprising one or more impregnated layers (21, 22, 23, 24, 25), comprising the steps of:
  i-1) providing a first non-woven sublayer (31), a second non-woven sublayer (32) and reinforcing filaments the form of a filament layer (51), in which the reinforcing filaments extending at least in part in one given direction;
  i-2) arranging said filament layer (51) atop of the second non-woven sublayer (32) and the first non-woven sublayer (31) atop of the filament layer (51);
  (i-3) joining first non-woven sublayer (31) and second non-woven sublayer (32) together, to form a first non-woven fabric (3) with embedded reinforcing filaments (51) extending at least partially in said one given filament direction;
  (i-4) impregnating the first non-woven fabric (3) with a first impregnation material (4) comprising, or consisting essentially of, a first thermoplastic, first thermoplastic elastomer, first elastomer or first thermoset and optional additives, to form a first impregnated layer (21) with an embedded filament layer (51);
  i-5) optionally and independently from steps i-1) to i-4), either
  i-5-a) providing one or more further non-woven fabrics (303, 304, 305) and one or more further sheets (403, 404, 405) of a further impregnation material comprising, or consisting essentially of, a further thermoplastic, further thermoplastic, further elastomer or further thermoset and optional additives;
  i-5-b) arranging said one or more further non-woven fabrics (303, 304, 305) and said one or more further sheets (403, 404, 405) adjacent to said first impregnated layer (21) and adjacent to each other, such that immediately adjacent to any non-woven fabric there is at least one further sheet, and immediately adjacent to any further sheet there is at least one further non-woven fabric;
  i-5-c) simultaneously with use of heat and pressure impregnating any further non-woven fabric by impregnation material from the at least one further sheet immediately adjacent to that non-woven fabric, to form a respective impregnated layer (21, 22, 23, 24, 25); and bonding any such impregnated layers (21, 22, 23, 24, 25) and said first impregnated layer (21) together;
  or
  i-5-d) providing one or more further impregnated layers (22, 23, 24, 25), each further impregnated layer comprising or consisting of a further non-woven fabric impregnated with a further impregnation material comprising, or consisting essentially of, a further thermoplastic, further thermoplastic, further elastomer or further thermoset and optional additives, and being devoid of reinforcing filaments;
  i-5-e) arranging said one or more further impregnated layers (22, 23, 24, 25) adjacent to said first impregnated layer (21) and adjacent to each other; and bonding any such further impregnated layers (21, 22, 23, 24, 25) and said first impregnated layer (21) with use of heat and pressure together.

10. A process for the manufacture of the belt carcass of claim 1 comprising two or more impregnated layers (21, 22, 23, 24, 25), comprising the steps of:
  ii-1) providing a first non-woven fabric (301), a second non-woven fabric (302), a first sheet (401) of a first impregnation material comprising, or consisting essentially of, a first thermoplastic, first thermoplastic elastomer, first elastomer or first thermoset and optional additives, a second sheet (402) of a second impregnation material comprising, or consisting essentially of, a second thermoplastic, second thermoplastic elastomer, second elastomer or second thermoset and optional additives, and reinforcing filaments in the form of a filament layer (52), in which the reinforcing filaments extend at least in part in one given direction;
  ii-2) arranging said filament layer (52), said first non-woven fabric (301), said second non-woven fabric (302), said first sheet (401) and said second sheet (402) adjacent to each other, such that on the one side of said filament layer (52) there is said first non-woven fabric (301) and said first sheet (401), and on the other side of said filament layer (52) there is said second non-woven fabric (302) and said second sheet (402), so as to sandwich the filament layer (52) between first non-woven fabric (301) and first sheet (401) on the one hand, and second non-woven fabric (302) and second sheet (402) on the other hand; to form a layered composite (6);
  ii-3) optionally and independently from steps ii-1) to ii-2), either
  ii-3-a) providing one or more further non-woven fabrics (303, 304, 305) and one or more further sheets (403, 404, 405) of a further impregnation material comprising, or consisting essentially of, a further thermoplastic, further thermoplastic, further elastomer or further thermoset and optional additives;
  ii-3-b) arranging said one or more further non-woven fabrics (303, 304, 305) and said one or more further sheets (403, 404, 405) adjacent to said layered composite (6) and adjacent to each other, such that immediately adjacent to any non-woven fabric there is at least one further sheet, and immediately adjacent to any further sheet there is at least one further non-woven fabric;
  ii-3-c) simultaneously with use of heat and pressure impregnating any non-woven fabric (301 or 302 or 303 or 304 or 305, respectively) by impregnation material from the at least one further sheet immediately adjacent to that non-woven fabric (401 or 402 or 403 or 404 or 405, respectively), to form a respective impregnated layer (21 or 22 or 23 or 24 or 25, respectively); and bonding all such impregnated layers (21, 22, 23, 24, 25) and said layered composite (6) together;

or ii-3-d) providing one or more further impregnated layers (22, 23, 24, 25), each further impregnated layer comprising or consisting of a further non-woven fabric impregnated with a further impregnation material comprising, or consisting essentially of, a further thermoplastic, further thermoplastic, further elastomer or further thermoset and optional additives, and being devoid of reinforcing filaments;

ii-3-e) arranging said one or more further impregnated layers (22, 23, 24, 25) adjacent to said layered composite (6) and adjacent to each other;

ii-3-f) with use of heat and pressure, bonding any such further impregnated layers (21, 22, 23, 24, 25) and said layered composite (6) together;

wherein said filament direction will form said belt's travel direction.

11. A process for the manufacture of the belt carcass of claim 1 comprising two or more impregnated layers (21, 22, 23, 24, 25), comprising the steps of:

iii-1) providing reinforcing filaments in the form of a filament layer (53), in which the reinforcing filaments extend at least in part in one given direction, and one first impregnated layer (21) comprising or consisting of a first non-woven fabric being impregnated with a first impregnation material comprising, or consisting essentially of, a first thermoplastic, first thermoplastic elastomer, first elastomer or first thermoset and optional additives, but being devoid of reinforcing filaments;

iii-2) either iii-2-a) providing one or more further non-woven fabrics (306, 307, 308) and one or more further sheets (406, 407, 408) of a further impregnation material comprising, or consisting of, a further thermoplastic, further thermoplastic elastomer, further elastomer or further thermoset and optional additives, the number of further non-woven fabrics (306, 307, 308) being equal to the number of further sheets (406, 407, 408) and being designated as K;

iii-2-b) arranging one further non-woven fabric (306), one further sheet (406) and optionally said filament layer (53), on one side of, and adjacent to, the first impregnated layer (21), such that, if the optional filament layer (53) is provided, it is sandwiched between said first impregnated layer (21) on the one hand and by the further non-woven fabric (306) and further sheet (406) on the other hand;

iii-2-c) simultaneously with use of heat and pressure, impregnating the further non-woven fabric (306) by the impregnation material from the further sheet (406), to form a further impregnated layer (22), and bonding first impregnated layer (21), optional sandwiched filament layer (53) and further impregnated layer (22) together; to form a bonded layered composite (7);

iii-2-d) repeating on said bonded layered composite (7) steps iii-2-b) and iii-2-c) for K−1 times, using still further pairs (307/407, 308,408) of still further non-woven fabric and still further sheet of still further thermoplastic, still further thermoplastic elastomer, still further elastomer or still further thermoset and optional additives; provided that in steps iii-2-b) and iii-2-c) and in said repetitions thereof the filament layer (53) is used in total exactly once;

or iii-2-e) providing one or more further impregnated layers (22, 23, 24, 25) each comprising or consisting of a further non-woven fabric being impregnated with a further impregnation material comprising, or consisting essentially of, a further thermoplastic, further thermoplastic elastomer, further elastomer or further thermoset and optional additives, the number of further impregnated layers (22, 23, 24, 25) being designated as K;

iii-2-f) arranging one further impregnated layer (22), on one side of, and adjacent to, the first impregnated layer (21), such that, if the optional filament layer (53) is provided, it is sandwiched between said first impregnated layer (21) on the one hand and by said second impregnated layer (22) on the other hand;

iii-2-g) with use of heat and pressure, bonding first impregnated layer (21), optional sandwiched filament layer (53) and further impregnated layer (21) together; to form a bonded layered composite (7);

iii-2-h) repeating on said bonded layered composite (7) steps iii-2-f) and iii-2-g) for K−1 times, using in each repetition one of said still further impregnated layers (23, 24, 25), provided that in steps iii-2-f) and iii-2-g) and in said repetitions thereof the filament layer (53) is used in total exactly once.

\* \* \* \* \*